United States Patent [19]
Gell et al.

[11] 3,888,650
[45] June 10, 1975

[54] GLASS MELTING FURNACES

[75] Inventors: Philip Anthony Maunsell Gell, Enville; Douglas Graeme Hann, Ryton, both of England

[73] Assignee: Elemelt Limited, London, England

[22] Filed: Nov. 8, 1974

[21] Appl. No.: 522,276

Related U.S. Application Data

[63] Continuation-in-part of Ser. No. 294,097, Oct. 10, 1972, abandoned.

[30] Foreign Application Priority Data
Oct. 2, 1971 United Kingdom............... 45942/71
Dec. 17, 1971 United Kingdom............... 58763/71

[52] U.S. Cl. .......................... 65/125; 13/6; 65/135; 65/337; 65/347; 65/DIG. 4
[51] Int. Cl............................................. C03b 5/36
[58] Field of Search ............ 65/135, 134, 125, 347, 65/337, DIG. 4; 13/6

[56] References Cited
UNITED STATES PATENTS
2,225,616 12/1940 Borel ........................ 13/6
3,108,149 10/1963 Carney et al. ................ 65/135 X
3,330,639 7/1967 Boettner et al. .............. 65/135 X
3,395,237 7/1968 Orton........................... 13/6
3,683,093 8/1972 Gell et al. ..................... 13/6

Primary Examiner—Robert L. Lindsay, Jr.
Attorney, Agent, or Firm—Spencer & Kaye

[57] ABSTRACT

A method and furnace for supplying glass for flat glass production in which the body of molten glass is contained in an elongate furnace chamber having melting and conditioning zones adjacent to opposite ends and an intermediate refining zone, the glass being subjected to general heating in the melting and refining zones while being substantially undisturbed in the conditioning zone, and a control column of glass being established in the refining zone by passing alternating electric current between longitudinally spaced transversely extending electrode arrays to establish a rising current or spring of glass, part of which flows horizontally upstream and part downstream at the surface of the glass to control the velocity and acceleration of glass flow in a surface layer of the conditioning zone.

15 Claims, 19 Drawing Figures

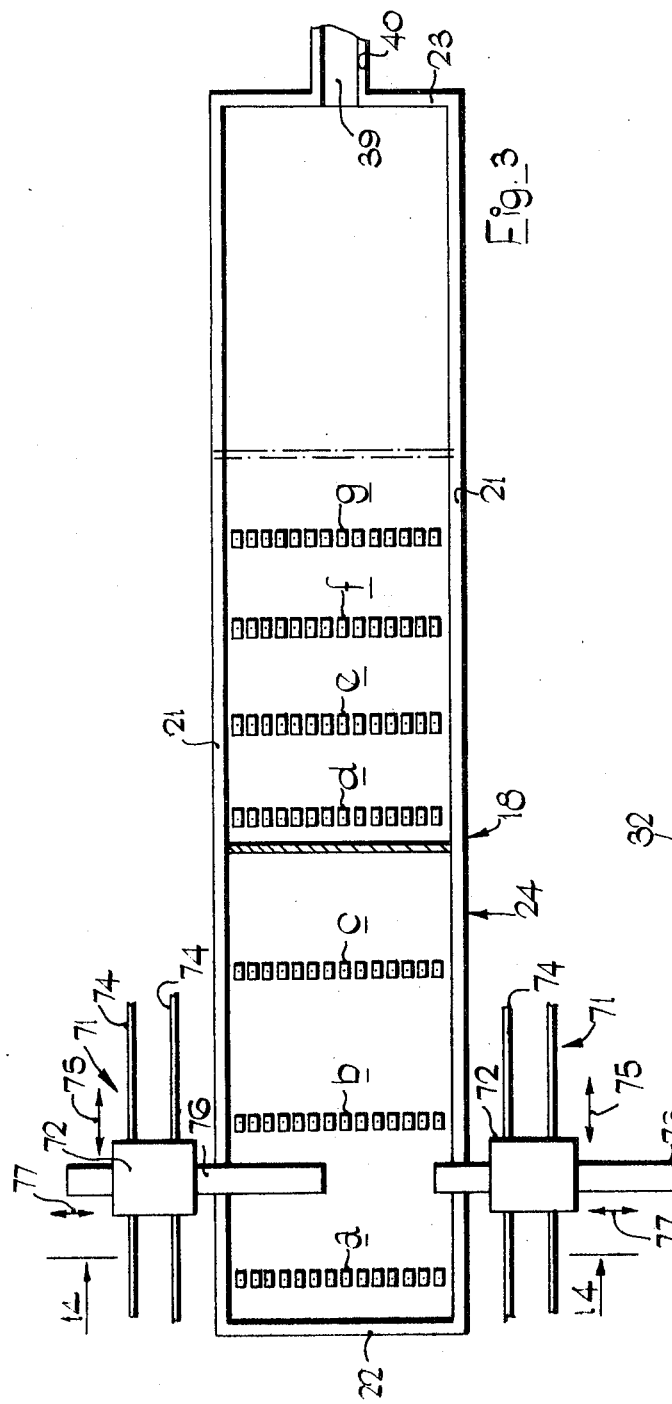
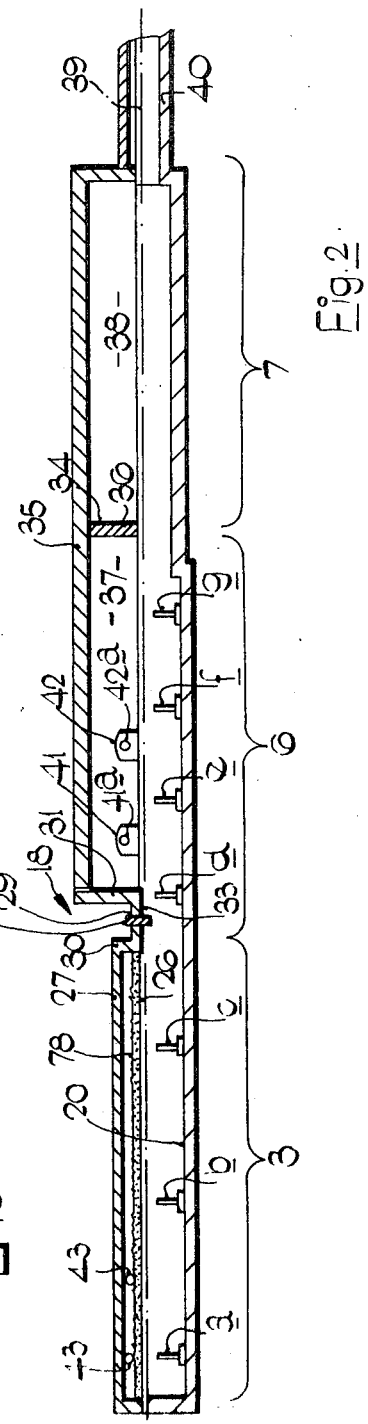

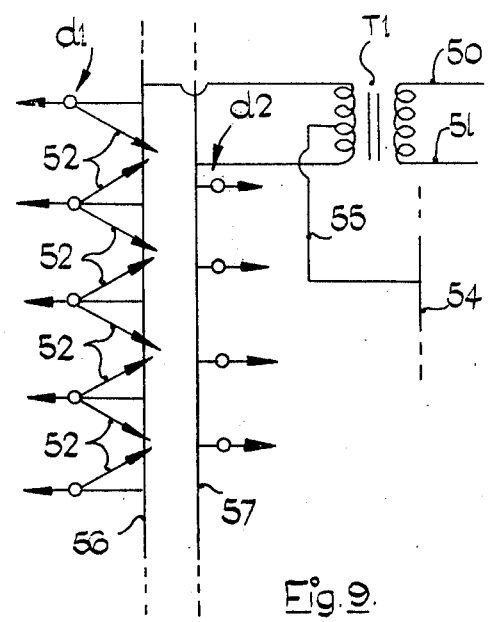
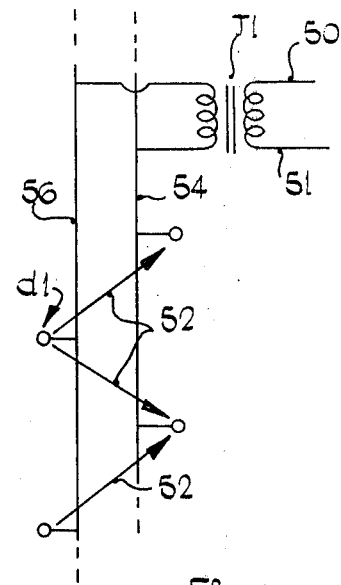
Fig. 9.   Fig. 10.
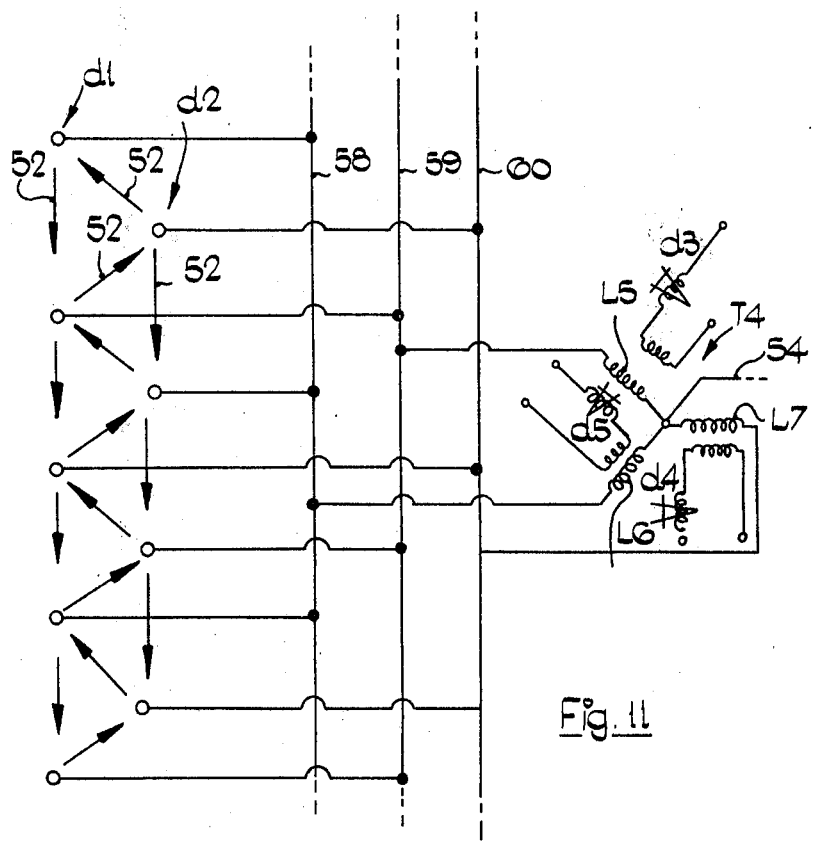
Fig. 11.

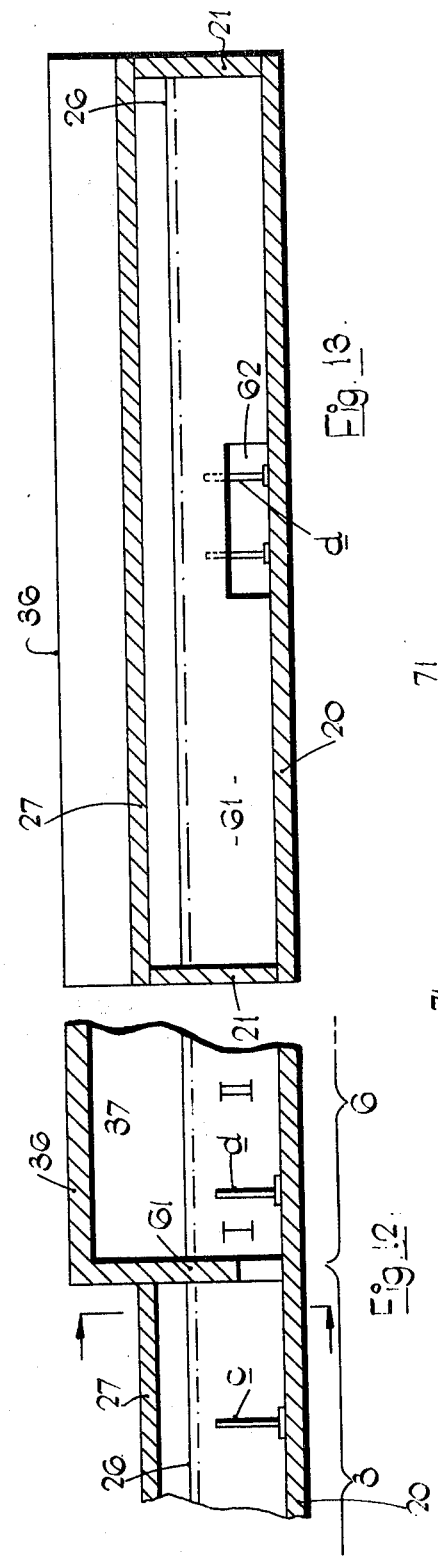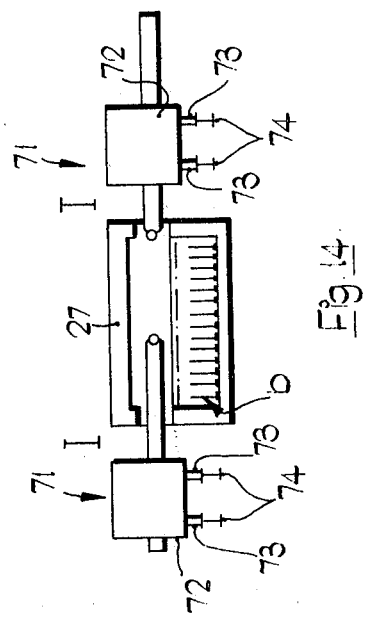

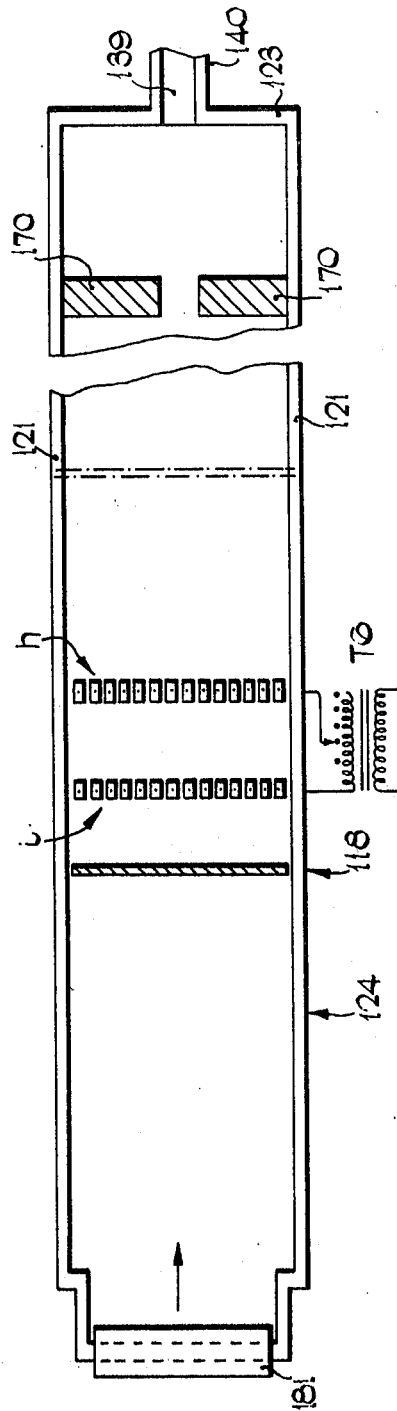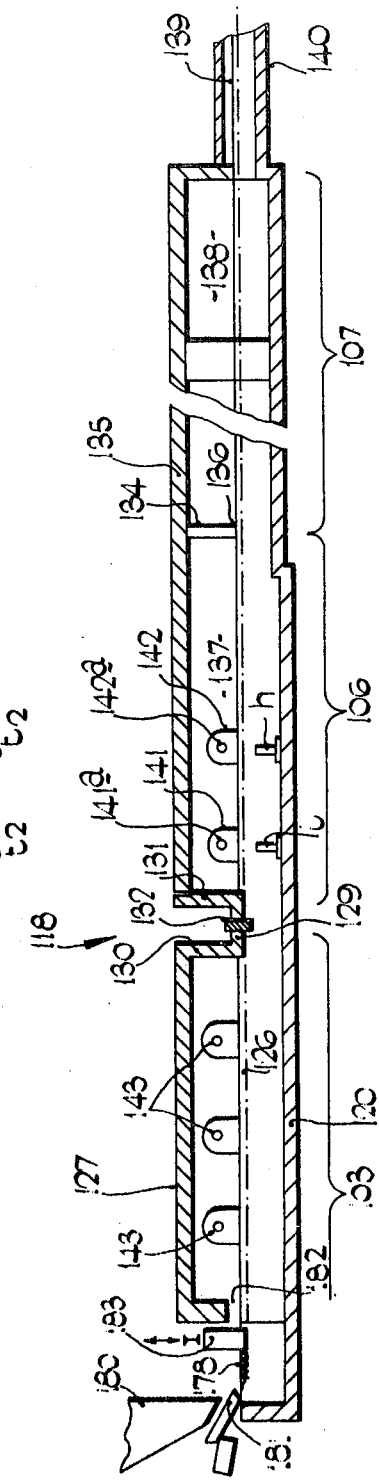

GLASS MELTING FURNACES

RELATED APPLICATIONS

This application is a continuation-in-part of our Application Ser. No. 294,097 filed Oct. 10, 1972 now abandoned.

BACKGROUND OF THE INVENTION

1. Field of the Invention

This invention relates to a method of providing a supply of molten glass and to a furnace therefor. The term "glass" used herein is to be deemed to include vitreous materials generally. In the supply of molten glass three stages are involved which are carried out in longitudinally successive zones of the furnace. The first is a melting zone in which solid state glass making materials commonly referred to as "batch" are converted into liquid form by heating. The second zone is a refining zone in which heat is supplied to the molten body of glass produced in the melting zone but no longer covered by or in contact with the batch to establish improved homogeniety of composition and liberate gaseous constituents from the body. The third zone is a conditioning zone in which heat transfer occurs between different portions of the glass to bring the glass into or towards a fully homogeneous condition as regards temperature, and heat exchange, usually by natural loss of heat, takes place to cause the glass to attain, at a withdrawal station, the temperature required for the particular purposes for which the glass is required to be used, all without disturbance of the refined condition.

The invention has been developed primarily to provide a supply of the conditioned glass suitable for use in the known method of making flat glass. In particular, but not exclusively, by the float glass process. In the following description the apparatus downstream of a withdrawal station from which the conditioned glass is supplied will be referred to as a flat glass plant, whereas a furnace in accordance with the present invention will be referred to as a glass supply furnace.

It will be understood, however, that a glass supply furnace in accordance with the present invention is not limited in its application to supplying conditioned glass to a flat glass plant since there may be other forms of apparatus which call for a supply of conditioned glass the characteristics of which are such as to make the glass supply furnace in accordance with the present invention suitable or advantageous for employment.

2. Description of the Prior Art

Heretofore the general practice in the construction of glass supply furnaces for supplying conditioned glass to flat glass plants has been to provide containment of the molten body of glass in an elongated tank in which the glass flows longitudinally and horizontally from one end portion constituting a melting zone, thence through an intermediate portion constituting a refining zone, and finally to a further end portion at the end of the tank remote from the melting zone and constituting a conditioning zone.

In at least the melting and refining zones heat has been supplied by burner means fed with fossil fuel. In this case the space above the glass in the melting zone must be enclosed by a furnace top to prevent loss of heat. The containment of the products of combustion in the above-the-glass space in both the melting and refining zones retains products of combustion in this space which may react possibly in an adverse manner with the glass. Hence careful control to combat such physical and chemical reactions may require to be exercised.

Proposals have been made involving the provision of an array of electrodes consisting of a single row extending upwardly from the bottom of the tank and across the width thereof, between which electrode alternating electric current is passed to effect heating of the glass in the immediate vicinity of such row and thereby establish the existence of an upwardly rising current or spring of glass. To be effective, however, it is necessary that the level of electrical energy dissipated in the glass shall be substantial and if such energy is communicated to the glass by way of a single row of electrodes it can affect and be dissipated only in a relatively narrow band of glass immediately adjacent to the electrode row. Consequently there is a severe limitation in the throughput or rate of flow of glass through such furnace because, unless the glass is resident in the immediate vicinity of said array for a reasonably prolonged period, enough energy will not be transferred thereto to establish the rising current.

On the other hand, it is often necessary to vary the rate of throughput for any given furnace in accordance with the demands of the plant or apparatus to which the glass therefrom is supplied, and it is necessary, therefore, to have the ability to control the velocity and acceleration of flow in the surface layers of glass preparatory to these surface layers reaching the withdrawal station for whatever value the throughput or overall rate may be set.

The movement of glass in the surface layers at the withdrawal station and for some distance upstream of the withdrawal station throughout the conditioning zone requires to be precisely controlled both as to the velocity and changes of velocity (acceleration) which occur during travel of the glass along this part of the furnace in order to ensure that the glass produced shall be of the required quality. In particular, any striations presented by flat glass produced should, so far as possible, extend in planes parallel to the surfaces of the flat glass rather than present lengthwise or transverse undulations.

If, for the purpose of exercising such control over flow, the voltage between successive electrodes of a single array is increased in an effort to pass a higher current and hence dissipate more energy as the throughput rises, then the principal function of the refining zone may be impaired because the high current density entailed will tend to produce electrolic generation of seed or bubbles, whereas one of the principal operations intended to be conducted in the refining zone is reduction in gaseous content. Such gaseous content will arise as a result of reactions between the newly molten batch constituents introduced into the furnace chamber in the melting zone.

SUMMARY OF THE INVENTION

The present invention is founded on the concept that the requisite control as to the movement of glass in the surface layers of the conditioning zone requires the input of electrical energy to establish a rising spring or flow control column in the refining zone, but that the manner of introducing the electrical current shall be such as to avoid the limitation that the furnace operates in a proper manner for only a restricted range of throughputs, and shall be such as to avoid impairing the proper functioning of the refining zone by an excessive concentration of current, that is high current density, at the point of introduction of the electrical energy.

Thus, according to the present invention, in a glass supply furnace which comprises a bottom wall and upstanding side walls defining an elongate furnace chamber for longitudinal flow of a body of glass from a charging station, adjacent to one end, to a withdrawal station adjacent to the opposite end of said chamber and at which said chamber has outlet means for withdrawing glass at a level in the region of the surface of the glass, said chamber having a melting zone extending over part of the length of said chamber downstream from said one end and in which glass making batch materials in the solid state are present on the upper surface of the glass body, a conditioning zone extending over a further part of the length of said chamber upstream from said other end but terminating at a distance from said melting zone, in which conditioning zone said chamber affords a free space above the glass and the glass is isolated from physical disturbance other than said longitudinal flow, a refining zone extending over the remaining part of the length of said chamber intermediate said melting and conditioning zones and from which said batch materials are absent, and heating means for heating the glass body generally throughout said melting and refining zones, we provide improved means for controlling the flow of glass comprising longitudinally spaced electrode arrays each extending upwardly from said bottom wall in an area in which, except for said electrode arrays, said chamber affords, throughout substantially the entire depth of said body of glass, an unobstructed space for said longitudinal flow of glass, each of said electrode arrays extending transversely of said chamber across substantially the entire width thereof to define the longitudinal boundaries of a flow control column of glass situated in said refining zone, and electrical supply circuit means connected to said electrode arrays to pass current through said column from one to the other of said arrays, said circuit means including regulator means for varying the magnitude of the current passing through said column to vary the temperature of said column relatively to the temperature of longitudinally spaced portions of said body of glass at respective longitudinal boundaries of said column.

By transferring electrical energy in the form of heat energy into the glass in a control column through passage of current between longitudinally spaced transversely extending electrode arrays, it is possible to select a volume for the control column which is adequate to receive the peak power dissipation which it is required to dissipate for the highest throughput value for which the furnace is designed without encountering the problems which are met in the use of a single transversely extending electrode array. The energy dissipated is distributed throughout this volume of glass which is heated more or less uniformly by the longitudinal passage of current between the two longitudinally spaced arrays and, therefore, not only are local overheating and electrolysis effects avoided, but the longitudinal boundaries of the control column can be selected at will rather than being determined by the heat conductive properties of the glass as when a single electrode array is used.

Furthermore, by utilisation of the longitudinally spaced arrays the overall volume of glass involved in the control column can be made significantly greater than is the case with a single transversely extending array, and consequently its hydraulic effect, when set in motion by convective flow, can be made such as to achieve the requisite control over surface layer velocity and acceleration at the relatively remote position towards the downstream end of the conditioning zone.

We further provide in a method of producing a supply of molten glass for flat glass production comprising the steps of flowing a generally horizontal elongate body of molten glass in, and longitudinally of, an elongate furnace chamber having a bottom wall and upstanding side walls, from one end of said chamber towards the other end, feeding glass making batch materials in the solid state onto the upper surface of said body to occupy a melting zone in which said materials float on the surface of said body and which extends downstream from said one end over part of the length of said body, withdrawing glass from said body at the downstream end of a conditioning zone extending upstream of said body from the other end thereof, in which conditioning zone said chamber affords a free space above the glass and the latter is isolated from physical disturbance other than said longitudinal flow, such withdrawal being effected from a level in the vicinity of the surface of said glass, heating said glass generally throughout said melting zone and throughout a refining zone occupying the remaining part of the length of said body intermediate said melting and conditioning zones, the improved method of controlling said flow of glass into a surface layer of the conditioning zone comprising the steps of further heating the glass by communication of alternating electric current thereto in said refining zone between electrode arrays in an area of said refining zone wherein said chamber affords an unobstructed space for said longitudinal flow of said glass, each of said electrode arrays extending upwardly from said bottom wall and from side to side between said side walls for substantially the entire width of said chamber, and being spaced apart longitudinally from each other to create a rising flow control column of glass of higher temperature than that of the glass immediately upstream and downstream of said column, and controlling the magnitude of said current to effect control over the rate of upward flow of glass in said column.

BRIEF DESCRIPTION OF THE DRAWINGS

The invention will now be described, by way of example, with reference to the accompanying drawings, wherein:

FIG. 2 is a view in side elevation and in vertical cross-section through one embodiment of glass supply furnace in accordance with the invention;

FIG. 3 is a plan view of the embodiment of FIG. 2 in horizontal cross-section of the surface of the molten body of glass;

FIGS. 5 to 11 illustrate different respective embodiments of auxiliary supply circuit for connection to one or more of the electrode arrays at positions at which a spring is required to be established;

FIG. 12 is a fragmentary view in side elevation and in vertical cross-section illustrating a modification of the embodiment illustrated in FIGS. 2 and 3;

FIG. 13 is a view in transverse cross-section on the line 13—13 of FIG. 12;

FIG. 14 is a view in end elevation and in vertical cross-section on the line 14—14 of FIG. 3;

FIG. 15 is a view in side elevation and in vertical cross-section through a further embodiment of glass supply furnace in accordance with the invention;

FIG. 16 is a plan view of the embodiment of FIG. 14 in horizontal cross-section at the surface of the molten body of glass;

DESCRIPTION OF THE PREFERRED EMBODIMENTS

Figure 1:
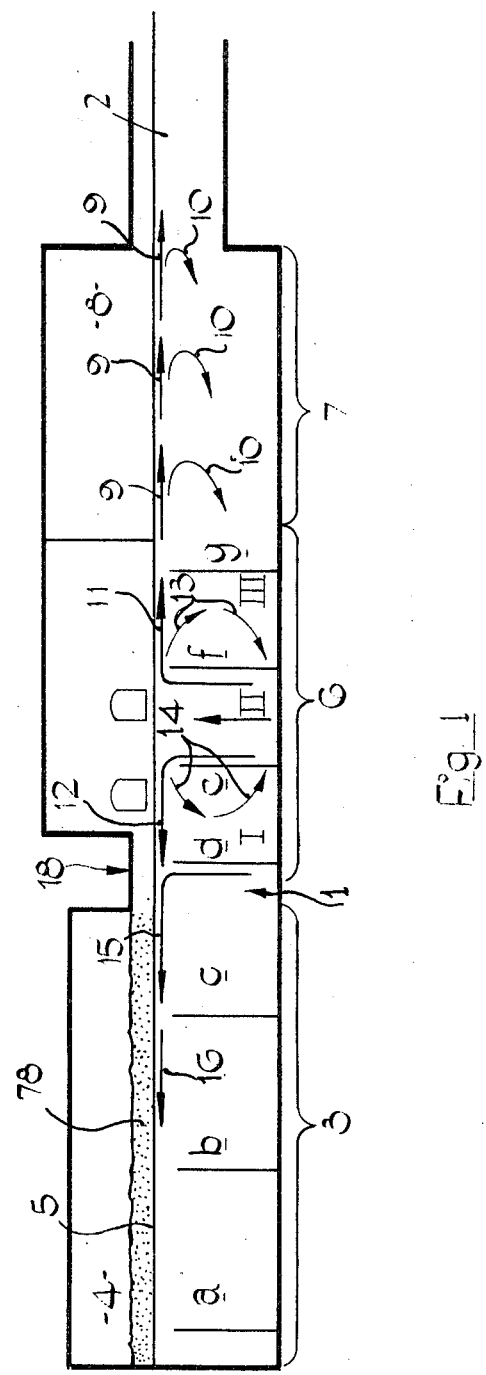
FIG. 1 is a diagrammatic view in side elevation and in vertical cross-section illustrating the method of the invention.

Referring firstly to FIG. 1, this illustrates diagrammatically the method of the invention. Flat glass is produced by withdrawing glass from the surface of an elongate rectangular body of molten glass 1, such withdrawal taking place from the surface layer 2 at a withdrawal station at one end of the body.

The body comprises three zones, namely a melting zone 3, a refining zone 6 and a conditioning zone 7.

In the melting zone glass batch materials in the solid state, as indicated at 5, are fed onto the surface of the montel glass by any suitable form of batch charger as hereinafter referred to. The principal functions carried out in the melting zone are the conversion of the solid state batch materials into the liquid state, which conversion takes place by melting of the solid state batch materials in contact with the molten glass. Where heating, as hereinafter described, in the melting zone is effected wholly or predominantly by way of passage of alternating electric current between electrode means immersed in the glass in the melting zone, the melting of the batch materials takes place at the interface between these materials and the liquid phase of the glass in this zone, the space above the glass being then comparatively cold and the batch covering or blanket 5 acting as a heat conserving medium.

Circulation of the glass takes place involving upward and downward currents since as batch material is melted from the underside of the batch blanket, the layers of molten glass at the surface tend to become cooler due to the absorption of latent heat and therefore descend convectively so that a constant circulation in vertical planes is set up.

The melting of the batch material and the interaction of the constituents of the batch material also produce evolution of gaseous constituents which may be partly liberated in the melting zone by rising to the surface of the molten body and undergoing outflow through the batch blanket, but the latter affords a restriction to this particular function which is predominantly carried out in the refining zone as hereinafter mentioned.

In the refining zone 6 heat is supplied to the molten glass to maintain it at a temperature at which gaseous constituents can rise to the surface and become liberated. The surface is thus maintained entirely free from batch material, such being effected by the general heating means provided in the melting zone. Apart from controlling flow into the surface layers of the conditioning zone, and operation and means with which the present invention is specifically concerned, the theoretically ideal conditions in the refining zone should maintain the entire body of glass contained therein at a temperature at which improvement takes place in the homogeneity of the glass, both as to composition and temperature distribution. Such temperature would be at a level effectively to promote liberation of gaseous constituents but not so high as to promote adverse chemical reaction between the glass and gaseous constituents such as oxygen or the products of combustion of fuel fired burners in the above-the-glass space in the furnace chamber within the refining zone.

As to the conditioning zone, the principal function carried out is to allow glass to flow generally longitudinally towards the withdrawal station while undergoing heat transfer between different portions to promote temperature uniformity while undergoing some general fall in temperature until, at the withdrawal station, it achieves the temperature requisite for the particular functions to be carried out in the associated apparatus for which the supply of glass is required. To promote and maintain the homogeneous character of the glass it is desired to avoid thermal and physical disturbance of the glass in the conditioning zone and consequently there is an absence of heating means, whether by way of immersed electrodes or burners in the space above the glass.

As shown in FIG. 1 and in the embodiment of FIGS. 2 and 3 in which FIG. 1 is diagrammatically representative, heating of the glass in both the melting and refining zones is by way of a plurality of electrode arrays each composed of upstanding electrode rods extending through the bottom wall of the tank in which the body 1 of glass is contained, with the electrodes in each array spaced apart from each other laterally of the tank. These arrays are designated $a$ to $g$.

It is of importance for the manufacture of satisfactory flat glass that striations, if any, extend parallel to the faces of the glass, as distinct from being wavy or corrugated in a direction lengthwise of the glass sheet produced, i.e., lengthwise of the elongate body from which the glass is withdrawn. To achieve this flow conditions in the surface layer 2 must be carefully controlled.

The velocity of flow of the glass at any given point requires to be controlled and also the change of velocity or acceleration.

In general, the flow of glass in this region of the body takes place by way of a horizontal progression of the glass downstream towards the withdrawal station 8, as represented by arrows 9, with some downward "peeling off" of the glass as represented by arrows 10. The glass which "peels off," i.e. descends, and flows reversely, may either rejoin the flow represented by the arrows 9 locally in the region in which it is "peeled off," or, if it moves more deeply to the lower regions of the conditioning zone 7 it may return to the refining zone for further circulation.

Heretofore the velocity and acceleration of the flow of glass, as represented by the arrows 9, has been controlled, partly by regulating the withdrawal rate at the withdrawal station, and partly by varying the quantity of fuel burnt in the space above the glass in the refining zone and in the melting zone, and hence varying the heating effect produced at different positions along the length of the elongate body in the space above this.

Whilst commercially satisfactory results have been achieved by this method, and it is in general use, it does undoubtedly require extremely close attention on the part of supervisors of the furnace in which the method is operated and is exposed to considerable random variations producing deterioration in the quality of the product, such for example as variations in the calorific value of the fuel supplied to the burners, variation in the amount of gaseous constituents liberated from the batch materials and glass leading to deflection of the burner flames, and variation in the composition of the products of combustion. All of these factors affect the temperature environment at any given place along the general path of glass flow from the charging station 4 to the withdrawal station 8.

As previously indicated in a general sense, proposals have also been made to provide a single row of electrodes in the refining zone to create an upwardly rising current of glass but this proposal is exposed to the limitations previously discussed, and in particular inability to supply the quantities of electrical energy required for a range of variation of throughputs which are commonly required to be utilised for any given capacity of furnace.

The present invention, on the other hand, entails heating a substantial volume of glass to form a convectively rising control column by the passage of electric current therethrough between two of the longitudinally spaced electrode arrays already mentioned, namely $e$ and $f$. The current passing between the arrays $e$ and $f$ is controlled relatively to that passing between adjoining pairs of arrays, namely $d$, $e$ and $f$, $g$ to provide a highly satisfactory form of control over the flow pattern of glass in the refining zone and hence into the conditioning zone so that the quantity of glass fed into the surface layer 2 flowing in the direction of the arrows 9 can be carefully controlled. Similarly the quantity of glass flowing in the opposite direction can be controlled for a purpose hereinafter described.

In the embodiment now described the electrode arrays in the refining zone 6 are in fact arranged to define the longitudinal boundaries of a plurality of columns rather than a single column, these being three in number. The first column I is bounded longitudinally by electrode arrays $d$, $e$, the second column II by $e$, $f$ and the third column III by arrays $f$, $g$.

The voltage applied across arrays $e$ and $f$ is adjusted to a value which provides a higher average temperature of glass in column II in comparison with that existing in I and III (controlled in each case by the voltage applied across arrays $d$, $e$ and $f$, $g$ respectively).

Accordingly glass tends to descend in columns I and III at a flow rate dependent upon the controlled temperature in these columns. Glass tends to rise in column II and the glass reaching the surface will thus divide, part flowing horizontally downstream, as indicated by arrow 11, to join the flow represented by arrows 9, and part flowing horizontally upstream, as represented by arrow 12, towards the melting zone.

A further degree of control over the quantity of glass joining the stream represented by arrows 9 from the streams represented by arrow 11 is, of course, achieved by controlling the temperature of column III and hence the quantity of glass peeling off downwardly from the flow 11 as represented by arrows 13. Likewise peel-off from the flow represented by arrow 12 into a path represented by arrows 14 is controlled by adjusting the temperature in column I.

In many cases the existence of the flow 12 will in itself be sufficient to prevent any unmolten batch material 5 from migrating to the refining zone. It may be assisted, however, when required by an upward convection current or spring originating in the vicinity of the electrode array $d$ and represented by the arrow 15.

In the event, however, that this proves inadequate, physical barrier means may be utilised to provide physical constraint to downstream migration of batch materials as represented diagrammatically by the surface barrier wall 18.

The flow control columns I, II, III may be employed in a method in which heating of the body 1 of glass is effected entirely by electric current passed through the glass by electrode means such as the arrays $a$ to $g$. In other cases, however, heating may be provided by means of burners in the space above the glass, the electrode arrays defining and providing for heating in one or more control columns to provide control over surface layer flow in the conditioning zone. In this case the quantity of heat so supplied by the burners in the refining zone may be substantially reduced in comparison with a conventional process, thereby reducing the undesirable effects already referred to.

A furnace suitable for carrying out the method is illustrated in FIGS. 2, 3 and 14 to which reference will now be made. This furnace is constructed and adapted for operation to supply glass to a flat glass plant, for example of the float type.

The furnace comprises an elongated rectangular tank having a bottom wall 20, side walls 21 and end walls 22 and 23. When intended to meet high throughput requirements, for example of the order of 400 short tons per day, it is contemplated that the tank will be from 160 feet to 190 feet in length, 30 feet in width and 4 feet 6 inches deep (this latter dimension being measured from the bottom wall of the tank to the normal surface level of the glass). These dimensions are given merely by way of example, but in general it is contemplated that the overall length of the tank will be in a range of four to six times its width. It is further contemplated that the normal depth of glass may be in a range from one tenth to one fifth the width of the tank.

For delivering batch materials to the melting zone a batch feeder means is provided, this being omitted for clarity in FIG. 2 but seen in FIGS. 3 and 14. Such batch feeder means may be of any suitable form and, as shown, comprises a pair of batch feeder units 71 disposed respectively on opposite sides of the chamber and each effective to spread batch materials over the adjacent half of the width of the surface of the molten glass in the melting zone 3. Each batch feeder unit comprises a carriage 72 having wheels 73 of which at least one pair is driven from a suitable motor through a reversing means enabling the carriage to travel on the rails 74 in forward and reverse directions as indicated by arrow 75.

Each batch feeder unit further comprises a boom 76 movable relatively to the associated carriage in a direction traversely to the chamber so that the inner end of the boom will move over a distance from the centre of the width of the chamber to a position over the adjacent lateral wall 21, as indicated by arrow 77.

The carriage 72 incorporates a hopper into which the batch materials are delivered at one position of travel of the carriage and the boom incorporates any suitable form of conveyor such as a belt conveyor for delivering the batch materials from the inner end of the boom.

Drive means for moving the boom is coordinated with the drive motor for the carriage so that the inner end of the boom scans the entire surface of the molten glass above the melting zone 3 to distribute a blanket or layer of batch material 78 onto the surface of the melt, the normal level of which is indicated by the line 26. This level may rise and fall to some extent as hereinafter mentioned.

Above the melting zone the furnace includes a roof 27 which may be supported by suspension means (not shown) and is mounted at a height above the surface 26 to accommodate the booms of the batch feeder units which can project over the surface of the melt through a longitudinally extending gap between the roof and the upper extremities of the side walls 21.

In the melting zone the furnace operates as a "cold top" chamber, in that the floating layer of batch material forms an effective thermal insulator with respect to the upward transmission of heat, thereby facilitating the construction of the batch charging means by virtue of the lower temperature environment in which this is called upon to operate.

As mentioned, segregation between the melting zone and the refining zone be accomplished in many cases merely by operation of the flow pattern of the glass as already described. However, it is preferred that the furnace be provided with a surface barrier means 18. This barrier means may be formed as a bridge or beam extending for the whole width of the tank and of channel shape in cross-section. It includes a horizontal wall 29 and longitudinally spaced vertical walls 30 and 31, of which the former may be connected to, and supported from, the suspended roof 27. Alternatively, or in addition, the bridge or beam may be independently supported at its ends at positions laterally beyond the side walls 21 of the tank.

The surface barrier means further comprises a downwardly extending rib formed conveniently as a structurally separate element from the horizontal wall. Thus the rib may be constituted by the lower portion of an elongated plate-like element 32 projecting through an aperture in the horizontal wall and possibly provided with means for adjusting the vertical position, and hence the extent of downward projection of the rib.

It will be noted that whereas the undersurface 33 of the bottom wall will normally be situated a short distance above the glass level 26, the rib projects downwardly into the glass. The vertical dimension of the interspace between the glass level 26 and the surface 33 is insufficient to allow migration of floating batch material between the melting and refining zones but should small particles pass beneath the surface 33 they will be positively arrested by the downward projection of rib.

The refining and conditioning zones are separated from each other in part by a shadow wall 34 which spans the space above the normal glass level 26 between this and a roof or crown 35 which encloses both of these zones. The lower edge face 36 of the shadow wall lies at a level which is slightly above the surface 33 but this is not critical, the function of the shadow wall being to isolate the above-the-glass compartment 37 from the above-the-glass compartment 38 of the refining and conditioning zones respectively.

At the end of the conditioning zone means defining the withdrawal station 8 are provided, for example an outlet 39 which may lead to a channel or feeder duct 40, of which, as shown, has a width less than the width of the tank. However, outlet may extend for the full width of the tank if desired.

General heating in the melting zone is effected by passage of electrical current between longitudinally spaced transversely extending electrode arrays $a$, $b$, $c$ and $d$. In the refining zone heating of the glass is effected, firstly by passage of current between arrays $d$, $e$, $e$, $f$, $f$, $g$ and additionally in the space 37 above the glass by burner means, for example burners 41a, 42a projecting through ports 41, 42. Control over the rate of upward flow of glass in the control column II between arrays $e$, $f$ is effected, as mentioned, by controlling the magnitude of the voltage applied between the arrays $e$, $f$. The remaining heating effected in the refining zone and which determines the temperature of the glass in the descending control columns I, III is determined partly by the heat furnished by the burners 41a, 42a in the space above the glass, and partly by the currents passing between arrays $d$, $e$ and $f$, $g$ respectively, this representing the general heating in the refining zone, as distinct from the additional heating applied in control column II for the purpose of creating the upward convection current.

Each of the electrode arrays comprises electrode rods projecting upwardly from the bottom wall 20 of the furnace, the rods being arranged in rows extending substantially across the entire width of the furnace at right angles to the length thereof. The arrays further comprise separate blocks incorporated in the bottom wall, such blocks being apertured to permit of the passing therethrough of respective electrodes and being formed of a material which is more highly resistant to erosion than the remainder of the bottom wall.

Such blocks may project to a slight extent as shown above the upper surface of the bottom wall. However, at least in the area between and immediately upstream and downstream of the arrays $e$ and $f$ defining control column II, the chamber affords a space which is unobstructed as regards longitudinal flow of glass throughout substantially the entire depth of the body of glass. In this area the electrode rods of the arrays $e$ and $f$ and their slightly raised mounting blocks are the only solid state bodies present so that glass is free to enter and leave the control column II and the latter can operate in a fully effective manner to control velocity of flow of glass in the surface layers of the body of glass as previously referred to. The electrode rods may have a height such that they occupy at least the lower half of the depth of glass and are preferably somewhat greater in height consistent with their upper ends remaining below the surface of the glass, a typical height being about two thirds of the depth of the glass.

Figure 4:
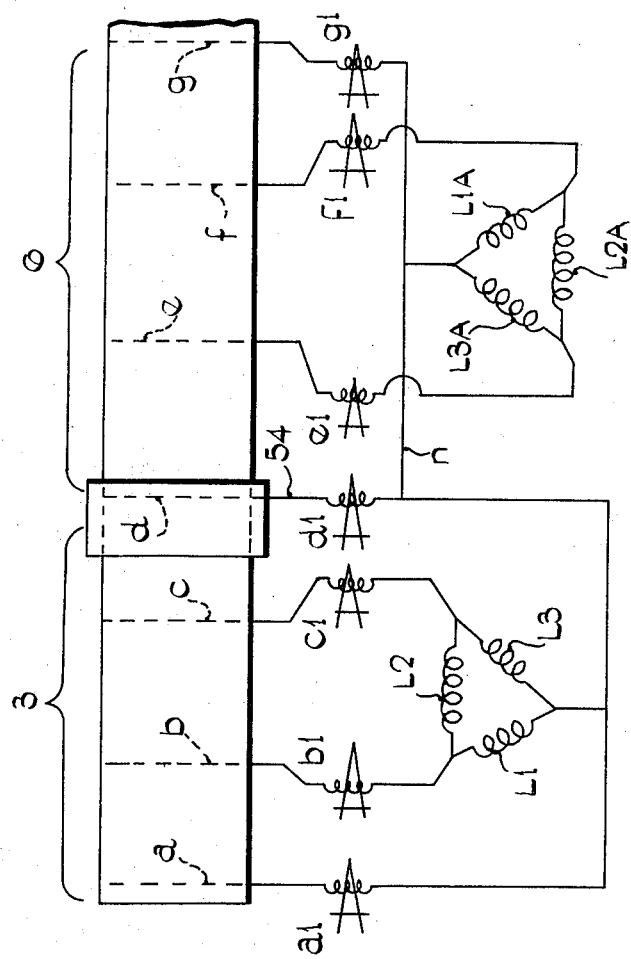
FIG. 4 is a circuit diagram illustrating an embodiment of main supply circuit for connection to the arrays of electrodes for passing current longitudinally of the tank.

A main supply circuit for feeding a main alternating electric current to the electrode arrays in a direction generally longitudinally of the furnace is shown in FIG. 4. This comprises two three-phase transformers of which for simplicity only the secondary windings are shown. The secondary windings as shown are connected in delta although star connected windings may be employed if desired. Voltages developed across windings L1A, L2A, L3A are respectively in phase with those across windings L1, L2, L3 and terminals of the two delta configurations are connected to electrode arrays as shown.

For regulating the voltage applied to glass between each pair of successive arrays, regulating means such as variable saturable reactors are incorporated in series with the conductors of the supply circuit feeding respective arrays. Saturable reactors designaetd $a^1$ to $g^1$ are connected in series with respective arrays $a$ to $g$. Certain of these adjustable saturable reactors may be eliminated without prejudice to the ability to adjust the individual voltage appearing across each pair of longitudinally successive arrays if desired.

It will be evident from the foregoing description relative to the method that adjustment of the saturable reactors $d1, e1, f1$ and $g1$ is effected in order to achieve the desired flow pattern represented by the arrows of FIG. 1 and already referred to.

Likewise the current fed to the array $d$ would be adjusted by means of the associated saturable reactor to produce convection current or spring represented by the arrow 15 should this be necessary.

Any of the arrays, adjacent to which the glass is required to flow upwardly, for example array $d$ or arrays $e$ and $f$, may be assisted in this function by connection to an auxiliary supply circuit of any one of the forms shown in FIGS. 5 to 11. For convenience in the following description, it will be assumed that such circuit is connected to array $d$ (or to a modified twin row array). It will be understood, however, that all of these arrangements may be applied equally to any of the arrays, more particularly $e$ and $f$.

Figure 5:
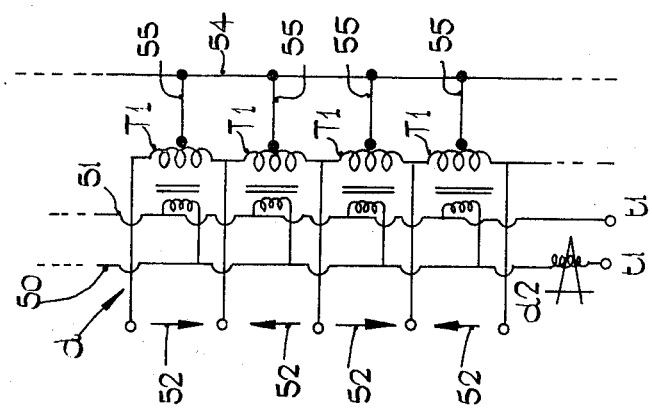

Referring firstly to FIG. 5, electrode $d$ positioned beneath the barrier means 18 is connected to an auxiliary supply circuit comprising transformers T1, the primary windings of which are fed in parallel from each other from two conductors 50 and 51 energised preferably through regulator means such as a variable saturable reactor $d2$ from a suitable single phase alternating current supply connected to terminals t1, t1.

The secondary windings of the transformers T1 are connected in series with each other and to respective electrodes in the array $d$, the two outermost of the latter being connected to the two outer terminals of the end transformers T1 and the remaining electrodes to the junction points of the series connected secondary windings.

The voltage developed between adjacent electrodes in the array $d$ causes auxiliary current to flow between these electrodes. The arrows 52 indicate the directions of instantaneous currents (in one half cycle of auxiliary current) between the electrodes of the array $d$.

The main supply circuit may be as disclosed in FIG. 4, the conductors 54 being connected, as shown in FIG. 5, by conductors 55 to centre tapping points on the secondary windings of transformers T1. Longitudinal flow of main current between the array $d$ and the arrays $c$ and $e$, is established by virtue of the voltlages developed across windings L3 and L3A of the transformers of the main supply circuit.

It is preferred that the phase of the voltage applied to conductors 50, 51 of the auxiliary supply circuit relatively to the voltage developed across L3, L3A shall be such that the auxiliary current and the main current are in phase quadrature, or approximately so.

In the embodiments illustrated in FIGS. 5 to 10, parts corresponding to those already described are designated by like numerals of reference and the preceding description is to be deemed to apply.

In the embodiment of FIG. 6 the auxiliary supply circuit comprises transformers T2, the primary windings of which are, as before, energised from conductors 50 and 51. These transformers, however, have their secondary windings connected in series between alternative electrodes in the array $d$ and the conductor 54 of the main current. With these arrangements each transformer T2 establishes an auxiliary current, the instantaneous direction of which is illustrated by arrows 52 between a group of electrodes in the array $d$.

Figure 7:
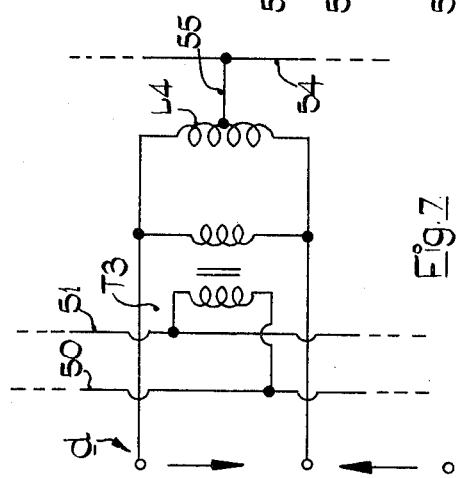

In the embodiment of FIG. 7, the transformers T3 replace transformers T1. These differ, in that, instead of providing a centre tapped secondary winding, the latter has a centre tapped inductance L4 connected in parallel with it, the centre tap of which is connected to the conductor 54 of the main supply circuit. The arrangement may enable a simpler construction of transformer T3 (in comparison with T1) to be utilised.

Figure 8:
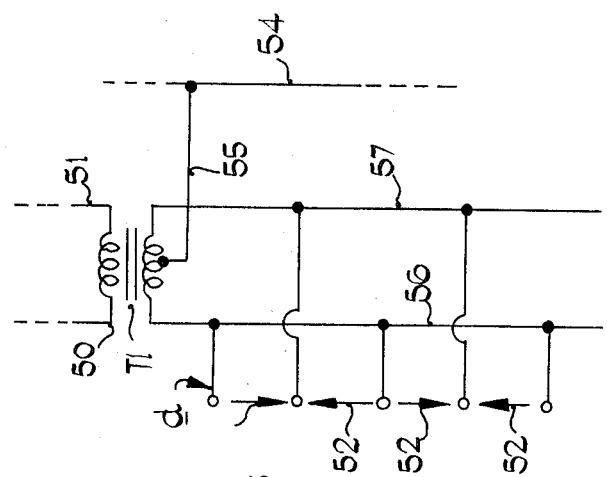

In the embodiment of FIG. 8, a single transformer T1 is used in place of the individual transformers T1 of FIG. 4.

The secondary winding of the single transformer T1 has its ends connected to conductors 56 and 57 which are connected respectively to alternately positioned electrodes in the array $d$.

Figure 9:
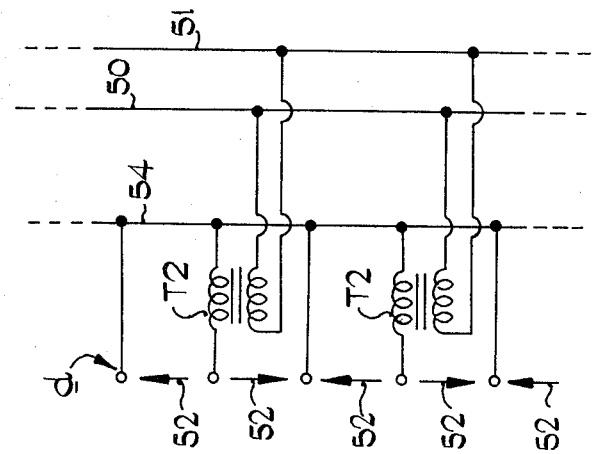

In the embodiment illustrated in FIG. 9, the array of electrodes comprises two rows instead of a single row, these being illustrated at $d1, d2$. The positions occupied may correspond to the array $d1, d2$ seen in FIG. 2. A single transformer T1 has its secondary winding connected to conductors 56, 57 which in turn are respectively connected to the electrodes of array $d1, d2$.

The direction of flow of auxiliary current internally of the array (over one half cycle) is indicated diagrammatically by the arrows 52 and is in a path of zig-zag configuration.

The transformer T1 may have its secondary winding centre tapped and connected to the conductor 54 of the main supply circuit. Alternatively, the conductor 54 of the main supply circuit may be utilised as one of the two conductors 56, 57 in which case a centre tap is not required.

An arrangement of this kind is illustrated in the embodiment of FIG. 10 wherein the conductor connected to the row $d2$ of the electrode array is the conductor 54 of the main supply circuit.

In the embodiment of FIG. 11, the electrode array comprises two rows of electrodes $d1, d2$ and the auxiliary supply circuit comprises a three-phase transformer having its primary windings connected to a three-phase source preferably through regulator means such as vertically saturable reactors $d3, d4, d5$. The transformer has secondary windings L5, L6, L7 connected in star with their outer ends connected to conductors 58, 59, 60.

Electrodes in the rows $d1, d2$ situated at the spaces of equi-lateral triangles are connected respectively to conductors 58, 59, 60 as shown.

The auxiliary current (in one half) flows in directions illustrated by the arrows 52.

It will be appreciated that in any of the foregoing arrangements a single transformer may be utilised for supplying the alternating current to the electrodes of the array as shown in several of the embodiments. Alternatively, where the auxiliary current supply is single phase individual transformers may be provided for feeding a pair of electrodes (as in certain of the embodiments) or in the case of a three-phase supply for feeding three electrodes in the array. It is also possible within the scope of the invention to provide a number of transformers for feeding a group of electrodes which may be more than two for a single phase alternating current supply and more than three for a three-phase alternating current supply where it is convenient to do so. These groups of electrodes would occupy respective sections of the length of the array.

For starting purposes fuel fed burners 43 positioned in the upper part of the melting zone above the normal glass level may be brought into operation temporarily. When a body of molten glass has been established in the melting zone, these burners may be withdrawn, or the supply of fuel thereto cut off, and heating is then entirely by supply of electric current to the electrode arrays $a$ to $d$. For a throughput as previously mentioned, the transformers, of which the secondary windings are shown at L1, L2, L3, may be separate transformers which together supply apporximately 11,200 K.W. of the molten body of glass in the melting zone producing a surface temperature at the exit on the melting zone of apporoximately 2,600°F.

The operation of the melting zone as a cold top chamber, by virtue of the covering of floating batch material on the surface of the molten body of glass, enables the quantity of sulphates normally fed to the glass to be reduced to a very small amount and largely eliminates reboil problems.

Under starting conditions burners 41, 42 in the space 37 above the normal level of glass in the refining zone may develop $10 \times 10^6$ BTU per hour use for heat energy. Thereafter the supply of fuel to these burners may be reduced so that the quantity of heat supplied corresponds to heat loss from the upper part of the furnace in the refining zone.

The electrical power supplied in the refining zone between electrode arrays $e, f$ and $g$ may typically be of the order of 4,500 K.W.

As referred to in describing the method of operation, the voltage across columns I, II, III (and, if necessary the voltage between individual electrodes of any array $d$, $e$ or $f$ connected to an auxiliary supply circuit such as those of FIGS. 5 to 11) will be adjusted to produce the desired flow pattern represented by the arrows shown in FIG. 1. In general it is contemplated that the difference between the average temperature of column II and columns I and III will be up to 25°C. In many instances operation to achieve the desired flow pattern is likely to be achieved by utilisation of a temperature difference in the lower part of this range.

It will be understood that the figures above referred to represent typical operation at the throughput of 400 short tons per day, and may be varied appropriately to meet differing requirements as to throughput and differing compositions of glass.

Referring now to the modification illustrated in FIGS. 12 and 13, parts corresponding to those already described with reference to FIGS. 2 and 3 are designated by like reference numerals and the corresponding description of to be deemed to apply.

In this embodiment, instead of providing a surface barrier wall 18, a transverse wall 61 is provided spanning the tank laterally and extending upwardly from the bottom wall 20 of the tank to effect physical separation between the melting and refining zones, both below the glass and thereabove.

In the region below the glass the wall 61 is formed with at least one opening 62 forming a throat through which communication exists below the level of glass between the melting and refining zones. Typically for the dimensions previously given, the opening 62 would have a height of about 2 feet and would have a width of about 5 feet.

As a possible alternative, a plurality of openings such as 62 but possibly of smaller dimensions may be provided at positions distributed across the width of the tank, having their lower boundaries coincident, or approximately coincident, with the surface of the bottom wall and situated at positioned selected to provide for transfer of glass from the melting zone to the refining zone such that a corresponding number of streams of glass enter the lower end of the column I.

Referring now to the embodiment illustrated in FIGS. 15 and 16, parts of the furnace corresponding to those already described for the embodiment of FIGS. 2, 3 and 14 are designated by like reference numerals with the prefix 100 and with respect to these parts of the furnace the preceding description is to be deemed to apply.

The principal difference of the embodiment of FIGS. 15 and 16 is that general heating in the melting zone and in the refining zone is accomplished through the employment of fuel fed burners 143 for the melting zone and 141$a$, 142$a$ in the refining zone. The form of batch feeder means provided for the melting chamber differs in consequence of the different mode of general heating. As shown batch materials are delivered by a chute assembly 180, 181 onto the exposed surface of the glass melt not covered by the roof structure 127. The batch material 178 is moved into the interior of the melting chamber through a gap 182 to which access is obtained when vertically movable barrier 183 is raised. Advancement of the batch material may be effected gravitationally but is possibly assisted by pusher means (not illustrated) until it spreads over the surface of the melt in the melting chamber.

In the refining chamber a single flow control column corresponding functionally to the control column II of the previously described embodiment is established between electrode arrays $h, i$, one of these arrays being of the same form as the arrays already described. The supply circuit for passing current between the arrays $h, i$ may be of simplified form in comparison with that already described comprising, for example, a transformer T6 having a secondary winding affording various voltage tappings to enable the voltage applied between the arrays to be varied, such transformer being energised from a main supply at terminals t2.

For furnaces having chambers of the order of 160 to 190 feet in length and 25 to 35 feet in width, and a side wall depth of 4 to 5 feet, the longitudinal spacing between the electrode arrays $h, i$ may vary between approximately 5 feet and approximately 20 feet.

The distance between these arrays will provide a volume of glass in the flow control column between the arrays which will enable the required amount of power to be transmitted electrically to the glass while avoiding the undesirable effect already mentioned, namely generation of gas bubbles or seed by electrolysis.

In general the distance between the arrays will be increased for increasing depths of furnace and increased for decreasing widths of furnace in order to maintain the required volume in the flow control column. The longitudinal dimension of the latter, however, as in the case of the previously described embodiment, will be substantially less than the overall length of the refining zone and preferably such that the refining zone is a plurality of times longer than the longitudinal dimension of any given control column, for example two or three times as long although an exact multiple relationship is not required.

If desired one or both of the arrays $h$, $i$ may be connected to an auxiliary supply circuit and, if desired, modified to incorporated more than one row of electrodes as already described with reference to the array $d$ of the previous embodiment. The auxiliary supply circuit may be any of those illustrated in FIGS. 5 to 11 hereof, as appropriate, except that instead of having a connection to conductor 54 it would have a connection to one or the other of the conductors joining array $i$ or array $h$ as the case may be to the secondary winding of transformer T6.

Further, the conditioning section 107 of the chamber may, if desired, be formed with a lateral constriction such as may be effected by the provision of laterally inwardly projecting portion 70. For a chamber having the dimension previously referred to, each of the projections 70 may typically have a dimension in the length of the chamber of some 4 to 5 feet and a dimension in the direction of the width of the chamber such that the distance between the inner ends of the projections is in the region of 4 to 6 feet. Each projection may extend at least for the depth of the glass and preferably for the whole depth of the side wall of the chamber.

The particular form of the outlet at the withdrawal station, in respect of each of the embodiments of furnace already described and illustrated, may vary somewhat according to the form and character of the apparatus for which the glass is required to be supplied.

Figure 17:
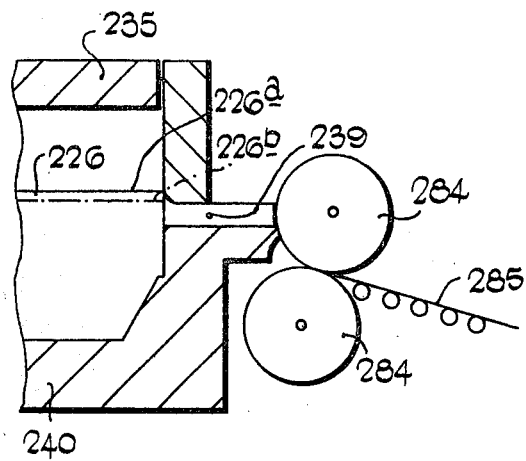
FIGS. 17, 18 and 19 are fragmentary views in side elevation and in vertical cross-section showing different forms of outlet at the withdrawal station of the furnace and which may be utilised on either of the embodiments of FIGS. 2, 3 and 14 or 15 and 16.
Figure 18:
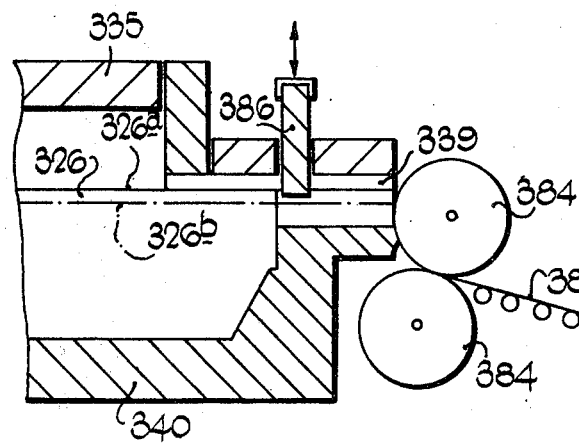
Figure 19:
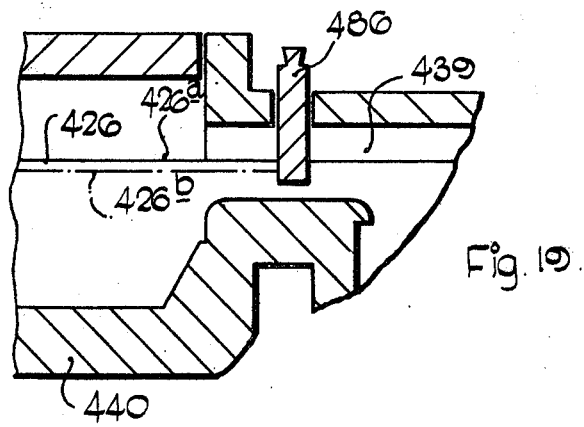

Typical forms of outlet are illustrated in FIGS. 17, 18 and 19. In these illustrations the portions of the chamber appearing are designated by references corresponding to those of the previously described embodiments with the prefixes 200, 300 and 400 as the case may be and the preceding description is to be deemed to apply.

Referring firstly to FIG. 17, the outlet is appropriate for furnishing glass to a glass plate rolling apparatus. The outlet itself 239 has its upper boundary a little below the surface 226 of the glass which typically may vary between the two limits 226a, 226b according to the quantity of glass in the furnace chamber at any given time.

The rollers between which the plate glass is formed are indicated for completeness at 284 and the resultant plate glass at 285.

In FIG. 18, showing another form of outlet suitable for feeding plate glass rolling apparatus, the outlet 329 has its upper boundary above the level 326 of the glass and may be equipped with a vertically adjustable gate member 386 which controls the flow of glass to the rollers 384.

In FIG. 19 the outlet is of a form suitable for furnishing glass to a float glass apparatus. In this case also the upper boundary of the outlet 439 is above the level 426 of the glass and the outlet flow is controlled by a vertically adjustable gate member 486.

We claim:

1. In a glass supply furnace comprising a bottom wall and upstanding side walls defining an elongate furnace chamber for longitudinal flow of a body of glass from a charging station, adjacent to one end, to a withdrawal station adjacent to the opposite end of said chamber and at which said chamber has outlet means for withdrawing glass at a level in the region of the surface of the glass, said chamber having a melting zone extending over part of the length of said chamber downstream from said one end and in which glass making batch materials in the solid state are present on the upper surface of the glass body, a conditioning zone extending over a further part of the length of said chamber upstream from said other end but terminating at a distance from said melting zone, in which conditioning zone said chamber affords a free space above the glass and the glass is isolated from physical disturbance other than said longitudinal flow, a refining zone extending over the remaining part of the length of said chamber intermediate said melting and conditioning zones and from which said batch materials are absent, and heating means for heating the glass body generally throughout said melting and refining zones, improved means for controlling the flow of glass comprising:
   a. longitudinally spaced electrode arrays each extending upwardly from said bottom wall in an area in which, except for said electrode arrays, said chamber affords, throughout substantially the entire depth of said body of glass, an unobstructed space for said longitudinal flow of glass, each of said electrode arrays extending transversely of said chamber across substantially the entire width thereof to define the longitudinal boundaries of a flow control column of glass situated in said refining zone,
   b. electrical supply circuit means connected to said electrode arrays to pass current through said column from one to the other of said arrays, said circuit means including regulator means for varying the magnitude of the current passing through said column to vary the temperature of said column relatively to the temperatures of longitudinally spaced portions of said body of glass at respective longitudinal boundaries of said column.

2. In a glass supply furnace the improvement according to claim 1 wherein the longitudinal spacing between said arrays is such that the relationship between the length of said control column measured longitudinally of the furnace chamber and the length of the refining zone is that the latter length is at least a multiple of the former length.

3. In a glass supply furnace the improvement according to claim 1 wherein:
   a. each of said arrays comprises electrodes extending upwardly through said bottom wall,
   b. said electrodes in each arrray being arranged in a row which is substantially rectilinear and at right angles to the length of said chamber.

4. In a glass supply furnace the improvement according to claim 1 wherein:
   a. said electrode arrays are of such number and so positioned as to define the longitudinal boundaries of at least two flow control columns of glass occupying different longitudinal stations,
   b. said regulator means is arranged for varying the magnitude of the current traversing one of said columns between said arrays at its longitudinal boundaries relatively to the current traversing the other of said columns between said arrays at its longitudinal boundaries.

5. In a glass supply furnace the improvement according to claim 1 wherein:
   a. said electrode arrays are of such number and so positioned as to define the longitudinal boundaries of three flow control columns occupying respectively upstream, intermediate and downstream, stations,
   b. said regulator means is arranged for varying the magnitude of the current traversing the control column occupying said intermediate station relatively to the magnitudes of the currents traversing said control columns occupying said upstream and said downstream stations, said currents traversing said columns longitudinally of said furnace chamber between said arrays.

6. In a glass supply furnace the improvement according to claim 1 wherein:
   a. at least one of said electrode arrays defining said longitudinal boundary of said control column comprises a plurality of electrodes extending upwardly through said bottom wall of said chamber at positions spaced apart laterally from each other and lying in an array zone, the dimension of which measured longitudinally of said tank is less than the longitudinally spacing between said arrays defining said control column,
   b. said supply circuit means includes an auxiliary supply circuit for applying voltage between said electrodes of said one of said electrode arrays to pass current between said electrodes internally of said array zone,
   c. said auxiliary supply circuit includes regulator means for varying said voltage applied between said electrodes.

7. A glass supply furnace comprising:
   a. a bottom wall and an upstanding peripheral wall defining an elongate chamber for containing molten glass in flow from one end to the other end of said chamber,
   b. means adjacent to one end of said chamber for charging glass batch material onto the surface of the molten glass to form a floating batch blanket thereon defining at least the downstream longitudinal boundary of a melting zone,
   c. means defining a conditioning zone extending from a withdrawal station adjacent to said other end of said chamber at which said chamber has outlet means for withdrawing glass at a level in the region of the surface of said molten glass, and in which said chamber affords a free space above the glass and the latter is isolated from physical disturbance except for said flow,
   d. means defining a refining zone having longitudinal boundaries adjacent to the downstream boundary of said melting zone and the upstream boundary of said conditioning zone respectively,
   e. heating means for heating the glass generally throughout said melting zone,
   f. heating means in said refining zone comprising
      i. longitudinally spaced electrode arrays each extending upwardly from said bottom wall in an area of said refining zone in which, except for said electrode arrays, said chamber affords, throughout subsbstantially the entire depth of said body of glass, an unobstructed space for said flow of said glass, each of said electrode arrays extending transversely of said chamber across substantially the entire width thereof to define the longitudinal boundaries of a flow control column of glass in said refining zone,
      ii. additional means for effecting general heating of said glass in said refining zone,
   g. electrical supply circuit means connected to said electrode arrays to pass current from one of said arrays to the other of said arrays, said circuit means including regulator means for varying the magnitude of the current passing through said column to vary the temperature of said column relatively to the temperature of the remaining portion of said glass in said refining zone.

8. A furnace according to claim 7 wherein said heating means for heating said glass generally in said melting zone comprises electrode means immersed in that portion of said glass occupying said melting zone and said electrical supply circuit means is connected to the last said electrode means for passing current through said portion of said glass in said melting zone.

9. A furnace according to claim 8 wherein:
   a. said electrode means in said melting zone comprise a plurality of longitudinally spaced electrode arrays each extending upwardly from said bottom wall and transversely of said chamber across substantially the entire width thereof,
   b. said electrical supply circuit means is connected to said electrode arrays in said melting zone to pass current between each array and the array or arrays longitudinally adjacent thereto.

10. A furnace according to claim 7 wherein said heating means for providing general heating in said melting zone comprises burner means mounted relatively to said chamber for supplying heat within said chamber at a position above the surface of said glass.

11. A furnace according to claim 10 wherein said additional heating means for supplying heat in said refining zone comprises burner means mounted relatively to said chamber for supplying heat within said chamber at a position above the surface of the glass in said refining zone.

12. A furnace according to claim 7 further comprising a physical barrier means extending transversely of said chamber above the surface of the glass at the vicinity of the junction between said melting and refining zones, and having a lower boundary situated in a height range extending from just above to just below the surface of the glass.

13. A furnace according to claim 12 wherein said physical barrier means comprises a fixed upper portion above the surface of the glass and an upwardly and downwardly adjustable submersible portion.

14. In a method of producing a supply of molten glass for flat glass production comprising the steps of flowing a generally horizontal elongate body of molten glass in, and longitudinally of, an elongate furnace chamber having a bottom wall and upstanding side walls from one end of said chamber towards the other end, feeding glass making batch materials in the solid state onto the upper surface of said body to occupy a melting zone in which said materials float on the surface of said body and which extends downstream from said one end over part of the length of said body, withdrawing glass from said body at the downstream end of a conditioning zone extending upstream of said body from the other end thereof, in which conditioning zone said chamber affords a free space above the glass and the latter is isolated from physical disturbance other than said longitudinal flow, such withdrawal being effected from a level in the vicinity of the surface of said glass, heating and glass generally throughout said melting zone and throughout a refining zone occupying the remaining part of the length of said body intermediate said melting and conditioning zones, the improved method of controlling said flow of glass into a surface layer of said conditioning zone comprising the steps of:

a. further heating the glass by communication of alternating electric current thereto in said refining zone between electrode arrays in an area of said refining zone wherein said chamber affords an unobstructed space throughout the depth of said glass body for said longitudinal flow of said glass, each of said electrode arrays extending upwardly from said bottom wall and from side to side between said side walls for substantially the entire width of said chamber, and being spaced apart longitudinal from each other to create a rising flow control column of glass of higher temperature than that of the glass immediately upsteam and downstream of said column, b. controlling the magnitude of said current to effect control over the rate of upward flow of glass in said column.

15. The method according to claim 14 wherein:

a. said step of further heating the glass is carried out by causing such alternating electric currents to pass through respective ones of at least two longitudinally successive columns, said currents being communicated to said columns by said electrode arrays extending upwardly from said bottom wall across substantially the entire width of said chamber at respective longitudinal boundaries of said columns, b. said step of controlling the magnitude of said current is carried out by controlling the magnitude of the current passing through one of said columns relatively to the magnitude of the current passing through at least one column adjacent to said one of said columns to control the rate of rise of glass in said one of said column.

* * * * *